(12) United States Patent
Arimilli et al.

(10) Patent No.: US 6,591,321 B1
(45) Date of Patent: Jul. 8, 2003

(54) MULTIPROCESSOR SYSTEM BUS PROTOCOL WITH GROUP ADDRESSES, RESPONSES, AND PRIORITIES

(75) Inventors: Ravi Kumar Arimilli, Austin, TX (US); James Stephen Fields, Jr., Austin, TX (US); Guy Lynn Guthrie, Austin, TX (US); Jody Bern Joyner, Austin, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,200

(22) Filed: Nov. 9, 1999

(51) Int. Cl.[7] .................... G06F 12/00; G06F 12/14; G06F 12/16; G06F 13/00; G06F 13/28

(52) U.S. Cl. ................ 710/110; 710/100; 713/1; 711/141; 711/144; 711/154; 711/168; 711/146

(58) Field of Search ...................... 710/100, 110; 711/141–168; 713/1

(56) References Cited

U.S. PATENT DOCUMENTS

| | | | | |
|---|---|---|---|---|
| 4,888,773 A | * | 12/1989 | Arlington et al. | 365/189.02 |
| 5,325,503 A | * | 6/1994 | Stevens et al. | 711/146 |
| 5,369,748 A | * | 11/1994 | McFarland et al. | 340/825.5 |
| 5,630,095 A | * | 5/1997 | Snyder | 365/49 |
| 5,704,058 A | * | 12/1997 | Derrick et al. | 711/168 |
| 5,938,765 A | * | 8/1999 | Dove et al. | 713/1 |
| 5,958,029 A | * | 9/1999 | McKinnon | 710/100 |

OTHER PUBLICATIONS

Webopedia on–line encyclopedia for computer technology, Sep. 1, 1997, definition for "bus mastering".*

* cited by examiner

Primary Examiner—Gopal C. Ray
Assistant Examiner—Justin King
(74) Attorney, Agent, or Firm—Casimer K. Salys; Bracewell & Patterson, L.L.P.

(57) ABSTRACT

A multiprocessor system bus protocol system and method for processing and handling a processor request within a multiprocessor system having a number of bus accessible memory devices that are snooping on. at least one bus line. Snoop response groups which are groups of different types of snoop responses from the bus accessible memory devices are provided. Different transfer types are provided within each of the snoop response groups. A bus master device that provides a bus master signal is designated. The bus master device receives the processor request. One of the snoop response groups and one of the transfer types are appropriately designated based on the processor request. The bus master signal is formulated from a snoop response group, a transfer type, a valid request signal, and a cache line address. The bus master signal is sent to all of the bus accessible memory devices on the cache bus line and to a combined response logic system. All of the bus accessible memory devices on the cache bus line send snoop responses in response to the bus master signal based on the designated snoop response group. The snoop responses are sent to the combined response logic system. A combined response by the combined response logic system is determined based on the appropriate combined response encoding logic determined by the designated and latched snoop response group. The combined response is sent to all of the bus accessible memory devices on the cache bus line.

24 Claims, 7 Drawing Sheets

| Fig. 3A |
| Fig. 3B |
| Fig. 3C |

```
8 ─ System Address Bus Signal Definition
   ========================================================================
        AVAL =                    Address Valid = Indicates request is valid
        Address (0=31)            Address Field
    9 ─ TType_Group (0=1)         Transfer Type Group = Read, RWITM, DCLAIM, Ack Group
   10 ─ TType (0=3)               Transfer Type
        Misc                      Transfer Size ... etc ─ System Snoop/Combined Response Signals
   ========================================================================
   11 ─ SResp (0=5)               Snoop Response Indication sent from snooper to cresp logic
   12 ─ CResp (0=2)               Combined Response Indication sent cresp logic to master/snoopers For each of the 4 TType_Group (0=1) encodings (Read, RWITM, DCLAIM, ACK Group), there exists
   a unique TType (0=3), SResp (0=5), and CResp (0=3) definition for that group. The advantage
   to this is it reduces the number of SResp and Cresp pins required.

15 ─ Example Definition of TTypes in 4 different Groups:
   ========================================================================
   9A ─ Read Group (TType_Group (0=1) = '00') =
        - coherent reads (require data to be delivered)
        10A ─ TType (0=3)
              0000         Cache Line Read (Type1)
              0001         Cache Line Read (Type2)
              0010         DMA Read (12BB)
              0011         Prefetch Read
              0011-1111    rsv 9B ─ RWITM Group (TType_Group (0=1) = '01') =
        - coherent store (require data to be delivered)
        10B ─ TType (0=3)
              0000         RWITM (Type1)
              0001         RWITM (Type2)
              0010-1111    rsv
```

Fig. 3A

9C — DCLAIM Group (TType_Group (0 = 1) = '10') =
  - coherent store (no data needs delivered)

10C — TType (0 = 3)
  0000        DClaim (Type1)
  0001        DClaim (Type2)
  0010        DCB2
  0010-1111   rsv 9D — ACK Group (TType_Group (0 = 1) = '11') =
  - commands that just need Acknowledge response 10D — TType (0 = 3)
  0000        Invalidate_Line (Type1)
  0001        Invalidate_Line (Type2)
  0010        rsv
  0011        CacheInhibited Load
  0100        CacheInhibited Store
  0101        DMA Partial Read
  0110        DMA Partial Store
  0111        Sync
  1000-1111   rsv 18 — Example Definition of Snoop Responses and Combined Responses in 4 different Groups

| 11 — SResp | 9A { Read_Group | 9B { RW/ITM_Group | 9C { DCLAIM_Group | 9D { ACK_Group |
|---|---|---|---|---|
| 00000 | null | null | null | null |
| 00001 | retry | retry | retry | retry |
| 00010 | L2_can_src | L2_can_src | - | - |
| 00100 | L3_can_src | L3_can_src | - | - |
| 01000 | - | go_Modified | go_Modified | - |
| 10000 | mem_ack | mem_ack | mem_ack | mem_ack |
|  | 9A { Read_Group | 9B { RW/ITM_Group | 9C { DCLAIM_Group | 9D { ACK_Group |
| 12 — CResp |  |  |  |  |
| 000 | adr_crr | adr_crr | adr_crr | adr_crr |

|     |        |          | retry    | retry           | retry |
|-----|--------|----------|----------|-----------------|-------|
| 001 |        | retry    | go_M = L2_src | go_M          | retry |
| 010 |        | L2_src   | go_M = L3_src | -             | ack   |
| 011 |        | L3_src   | go_M = Mem_src | -           | -     |
| 100 |        | Mem_src  | -        | -               | -     |
| 101-111 |    | -        |          |                 |       |

20 — Master Behavior
- initiate req in appropriate TType_Group for creation being performed
- latch TType_Group used to initiate Fabric Reag and interpret Cresp based on encoded definition of CResp for that TType_Group 22 — Snooper Behavior
- based on TType_Group, drive SResp signals to reflect definition of encoding for the TType_Group which reflects current state of the snooper.

24 — L2 Bus Master TType (0 = 3), TType_Group Commands formed from Requests from Processor

| 26 — Proc Command | L2 Cache State | TType_Group (0 = 1) | TType (0 = 1) |
|---|---|---|---|
|   | 28 | 9 | 10 |
| 26A ⎧ Cacheable Ops = | | | |
| Read | Invalid | Read | Read (Type1 or 2) |
| Prefetch Read | Invalid | Read | Prefetch Read |
| Store | Invalid | RWITM | RWITM (Type1 or 2) |
| Store | Shared | DClaim | DCLAIM |
| DCBZ | Shared or Invalid | DClaim | DCBZ |
| Invalidate_Line | na | Ack | Invalidate_Line (Type1 or 2) |
| 26B ⎧ Non-Cacheable/Mist Ops = | | | |
| CacheInhibited-Load | na | Ack | CacheInhibited-Load |
| CacheInhibited-Store | na | Ack | CacheInhibited-Store |
| Sync | na | Ack | Sync |

MULTIPROCESSOR SYSTEM BUS PROTOCOL WITH GROUP ADDRESSES, RESPONSES, AND PRIORITIES

RELATED APPLICATIONS

The present invention is related to the subject matter of commonly assigned, U.S. patent applications: Ser. No. 09/437,199 issued as U.S Pat. No. 6,336,160 and Ser. No. 09/437,196 issued as U.S. Pat. No. 6,405,289. The content of the above-identified applications is incorporated herein by reference.

BACKGROUND OF THE INVENTION

1. Technical Field

The present invention generally relates to a multiprocessor system bus protocol, and, in particular, a multiprocessor system bus protocol with group addresses, responses, and priorities. Still particularly, the present invention relates to a multiprocessor system bus protocol wherein snoop responses are grouped into different types of responses and managed and handled by the groups.

2. Description of the Related Art

A computer program executed by multiple processors typically needs to have the same copies of data in various cache memory devices. The performance of the computer program executed by multiple processors is directly related and dependent on the performance of sharing data by the system. Multiprocessor cache coherency must be maintained in order to reduce bus traffic. "Cache-coherency protocols" are protocols used to maintain coherency among multiple processors. One class of cache-coherency protocol that is used to maintain cache coherency is "snooping". "Snooping" generally involves every cache that has a copy of data from a memory block (i.e. physical memory) also possessing a copy of information about that data. The caches are typically on a shared-memory bus. Each cache controller monitors or "snoops" on the bus to determine whether or not they have a copy of the shared block. The coherency problem involves the processor exclusively accessing the write function of an object and making sure that it has the most recent copy when performing a read function of an object. All caches sharing the object to be written must be located by the snoop protocol. When a write-to-shared data operation occurs, the decision of whether to invalidate all other copies or to broadcast the write to all shared copies must be made. These above concepts are developed and disclosed in the text entitled *Computer Architecture A Quantitative Approach*, by David A. Patterson & John L. Hennessy, Morgan Kaufmann Publishers, San Mateo, Calif., Copyright 1990.

A request of data in a memory block(s) is made by the computer program. All caches respond to the request with a "snoop response" in order to take appropriate action and/or execute the response to the request. Computer systems, of course, may have a number of cache memory devices. Managing these cache memory devices and their respective snoop responses may become quite a task, especially if a large number of cache devices exist and/or if the number of snoop responses is or is becoming voluminous.

For example, the memory device has to individually send each snoop response to a respective location, and the combined response logic system has to handle each and every snoop response. Various types of snoop responses exist and are well known in the art, and different types of snoop responses are handled in different ways. The manner in which a large number of snoop responses that are handled by a combined response logic system would result in at least two key problems. One problem is that the bus or wire from a memory device to the combined response logic system and the bus or wire from the combined response logic system to the memory device may have to be made larger in size (i.e. in bit size) to accommodate all of the various snoop responses. Another problem is that the combined response logic system may be slowed down and become very inefficient in having to receive and handle each snoop response for generating a combination response (especially if a large number of responses are provided by the memory devices) for the memory devices.

It would be advantageous and desirable to provide a system and method for better managing and handling snoop responses, particularly large number of snoop response, and respective combined responses in a multiprocessor system bus protocol or snoop protocol wherein the combined responses and snoop responses are generally between memory devices and a combined response logic system. It would also be advantageous and desirable to provide a system and method that minimizes and/or reduces the size of the bus or wire between each memory device and the combined response logic system wherein a snoop response is sent from each memory device to the combined response logic system. It would also be advantageous and desirable to provide a system and method that minimizes and/or reduces the size of the bus or wire between the combined response logic system and each memory device wherein a combined response is sent from the combined response logic system to each memory device. It would further be advantageous and desirable to provide a system and method that provides faster and more efficient handling of snoop responses by a bus master and the combined response logic system. Thus, it is advantageous and desirable to provide a multiprocessor system bus protocol wherein snoop responses are grouped into different types of responses and the groups are thereby managed and handled.

SUMMARY OF THE INVENTION

It is therefore one object of the present invention to provide a system and method for better managing and handling snoop responses and respective combined responses in a multiprocessor system bus protocol or snoop protocol wherein the combined responses and snoop responses are generally between memory devices and a combined response logic system.

It is yet another object of the present invention to provide a system and method that minimizes and/or reduces the size of the bus or wire between each memory device and the combined response logic system wherein a snoop response is sent from each memory device to the combined response logic system.

It is yet another object of the present invention to provide a system and method that minimizes and/or reduces the size of the bus or wire between the combined response logic system and each memory device wherein a combined response is sent from the combined response logic system to each memory device.

It is another object of the present invention to provide a system and method that provides faster and more efficient handling and managing of snoop responses by a bus master and the combined response logic system.

It is a further object of the present invention to provide a multiprocessor system bus protocol wherein snoop responses are grouped into different types of responses and the groups are thereby managed and handled.

The foregoing objects are achieved as is now described. A multiprocessor system bus protocol system and method for processing and handling a processor request within a multiprocessor system having a number of bus accessible memory devices that are snooping on at least one bus line. Snoop response groups which are groups of different types of snoop responses from the bus accessible memory devices are provided. Different transfer types are provided within each of the snoop response groups. A bus master device that provides a bus master signal is designated. The bus master device receives the processor request. One of the snoop response groups and one of the transfer types are appropriately designated based on the processor request. The bus master signal is formulated from a snoop response group, a transfer type, a valid request signal, and a cache line address. The bus master signal is sent to all of the bus accessible memory devices on the cache bus line and to a combined response logic system. All of the bus accessible memory devices on the cache bus line send snoop responses in response to the bus master signal based on the designated snoop response group. The snoop responses are sent to the combined response logic system. A combined response by the combined response logic system is determined based on the appropriate combined response encoding logic determined by the designated and latched snoop response group. The combined response is sent to all of the bus accessible memory devices on the cache bus line.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3C together present tables of different example definitions and formats of the bus master signal, the snoop response signals, and the combined response signal for the present invention multiprocessor system bus protocol with group addresses, responses, and priorities;

DETAILED DESCRIPTION OF THE PREFERRED EMBODIMENT

Figure 1:
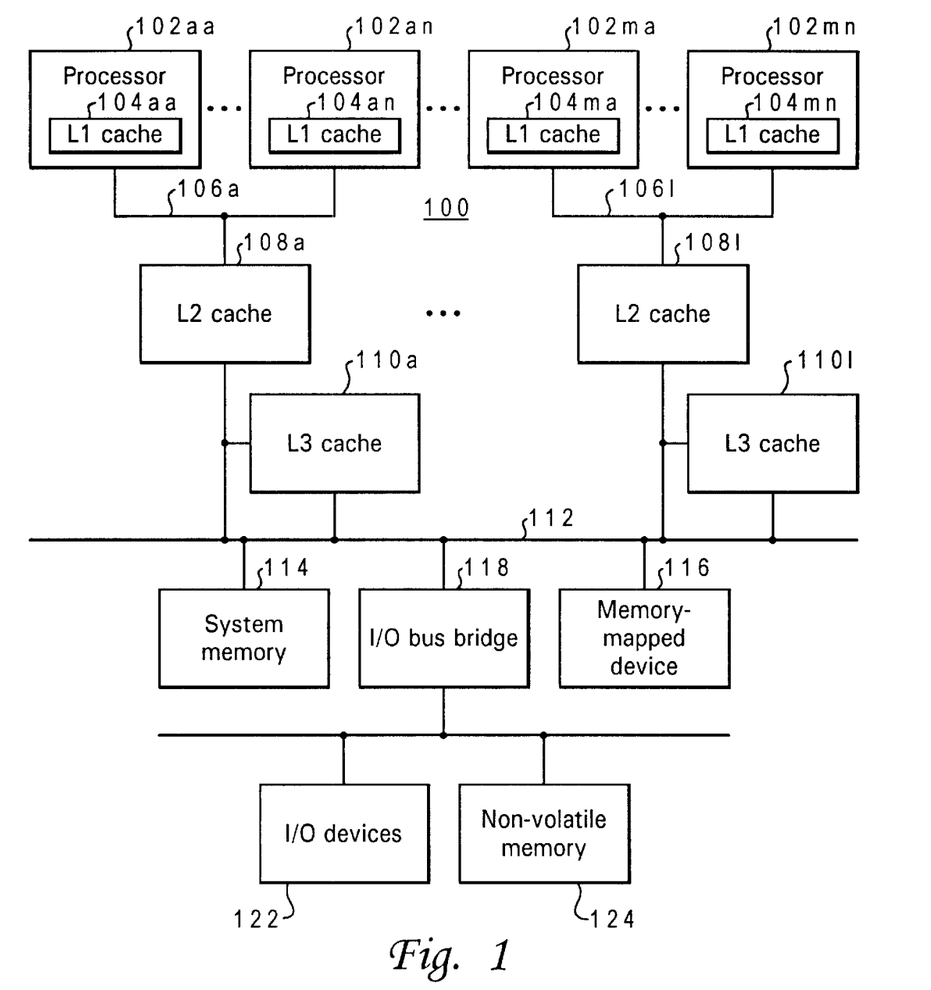
FIG. 1 depicts a block diagram of a data processing system in which a preferred embodiment of the present invention may be implemented.

With reference now to the figures and in particular with reference to FIG. 1, a block diagram of a data processing system in which a preferred embodiment of the present invention may be implemented is depicted. Data processing system 100 is a symmetric multiprocessor (SMP) system including a plurality of processors 102aa through 102an and 102ma through 102mn (where "m" and "n" are integers). Each processor 102aa–102mn includes a respective level one (L1) cache 104aa–104mn, preferably on chip with the processor and bifurcated into separate instruction and data caches. Each processor 102aa–102mn is coupled via a processor bus 106aa–106l to a level two cache 108a–108l (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108l is coupled to a level three (L3) cache 110a–110l and to system bus 112. L3 caches 110a–110l are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108l and L3 caches 110a–110l—are employed to stage data to the L1 caches 104a–104l and typically have progressively larger storage capacities but longer access latencies. L2 caches 108a–108l and L3 caches 110a–110l thus serve as intermediate storage between processors 102a–102l and system memory 114, which typically has a much larger storage capacity but may have an access latency many times that of L3 caches 110a–110l. Both the number of levels in the cache hierarchy and the cache hierarchy configuration (i.e, shared versus private, in-line versus lookaside) employed in data processing system 100 may vary.

L2 caches 108a–108l and L3 caches 110a–110l are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling for the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2:
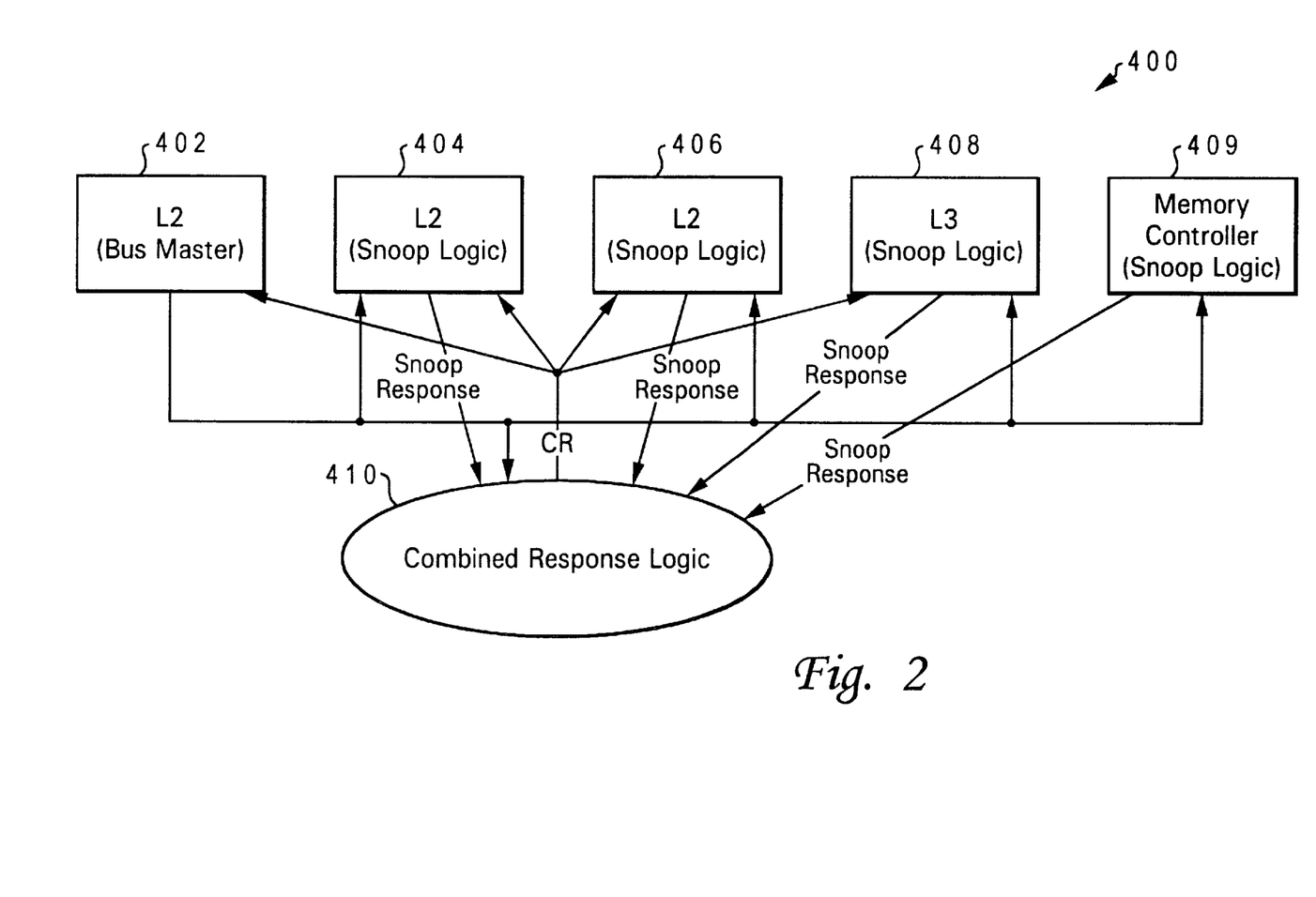
FIG. 2 is a block diagram of a system for handling and combining snoop responses to provide a combined response that is used in implementing the present invention multiprocessor system bus protocol with group addresses, responses, and priorities.

With reference now to the figures and in particular with reference to FIG. 2, a block diagram of a system 400 for handling and combining snoop responses to provide a combined response is shown. The system 400 handles snoop responses to provide a combined response in a manner that implements and utilizes the present invention multiprocessor system protocol with group addresses, responses, and priorities. The system 400 comprises the bus master logic 402 of the bus master L2 cache and the snoop logic 404, 406, 408, 409 of the snooper L2 caches, snooper L3 cache, and snooper memory controller device coupled to a combined response logic system 410. The example selected for the purposes of describing the invention relates to L2 caches 108a–108l, L3 caches 110a–110l and system bus 112 as depicted in FIG. 1.

In the exemplary embodiment shown for the present invention, the L2 bus master logic 402 receives a data access operation or request (i.e. processor request) from an in-line processor 102aa which misses (i.e. a cache miss) the L1 cache 104aa and the L2 cache 108a. The L2 bus master logic 402 initiates a system bus operation to elicit a combined response from the other snoop logic 404, 406, 408, and 409 (this signal will later be discussed in more detail). This system bus operation generally provides and/or identifies: the validity of the request; the address for the request; a type of snoop response that is to be elicited wherein the snoop response is identified by being in one of the groups of snoop responses; and by one of the transfer types within the group that designates the manner or way of data transfer in executing the snoop response. The bus master interface logic 402 of the L2 cache therefore elicits or initiates (acting as a "bus master" after requesting and being granted the system bus) snoop responses derived from each snoop logic 404, 406, 408, and 409.

The signal (i.e., system bus operation) sent by the bus master logic 402 is detected by snoop logic 404, 406, 408, and 409 within the remaining memory devices (i.e. L2 caches, L3 cache, memory controller) coupled to the system bus 112 and is also received by a combined response logic 410 (which is typically a part of the bus controller or the memory controller). Snoop logic 404, 406, 408, and 409 check their states within their respective devices. In providing a snoop response to the request or data access operation based on the information provided therein, snoop logic 404, 406, 408, and 409 each checks the validity of the request and provides a snoop response based on the snoop response type which is defined by a group of the snoop response and a transfer type within that group.

The snoop response groups selected by the master may include but are not limited to a read group, a read with intent to modify (RWITM) group, a data-claim group, and an acknowledge group. The snoop responses for the given snoop response group are derived from the respective snoop logic 404, 406, 408, and 409 and are combined into the combined response logic 410. The combined response logic 410 evaluates states of the snoop logic 404, 406, 408, and 409 based on the respective snoop responses for the given snoop response group. The combined response logic 410 generates a combined response ("CR") that is based on and a function of the respective snoop responses and the snoop response group. The combined response is sent or broadcast to all of the snoop logic and the bus master logic of the various devices. Thus, the combined response logic 410, in effect, manages and ultimately makes decisions as to which snoop logic device performs and executes which and what operations or functions.

Thus, the combined response logic 410 receives the snoop responses generated by snoop logic 404, 406, 408, and 409 and generates a combined response to be driven on system bus 112. The combined response is received by the bus master logic 402 and snoop logic 404, 406, 408, and 409. Snoop logic 404, 406, 408, and 409 upon detecting the combined response determines whether a change of the coherency state within the corresponding device is possible. Therefore, the combined response logic 410 in essence is evaluating the state of every snooper and combining it into one response. The single response is then broadcast to all the snoopers and to the bus master as well.

Figure 3B:
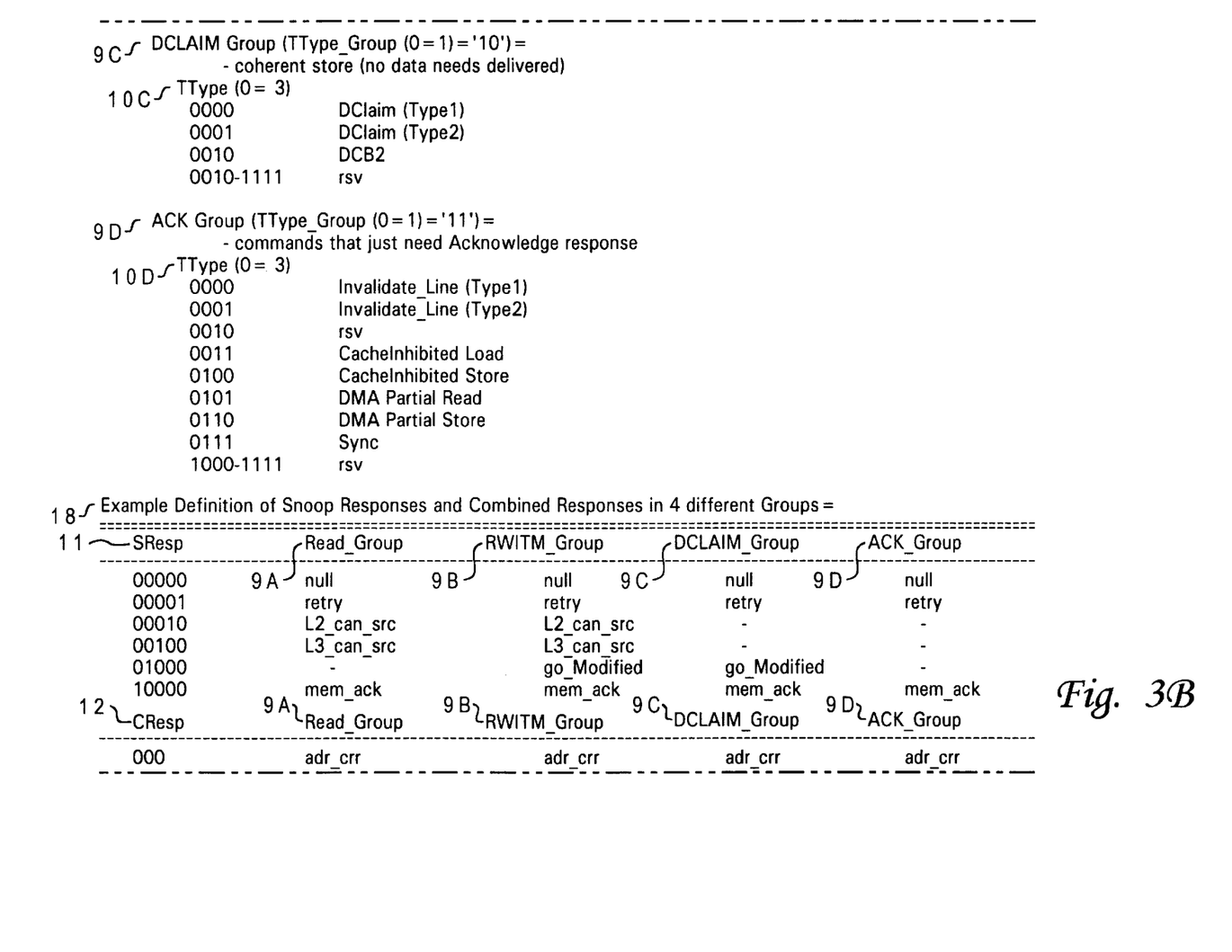
Figure 3C:
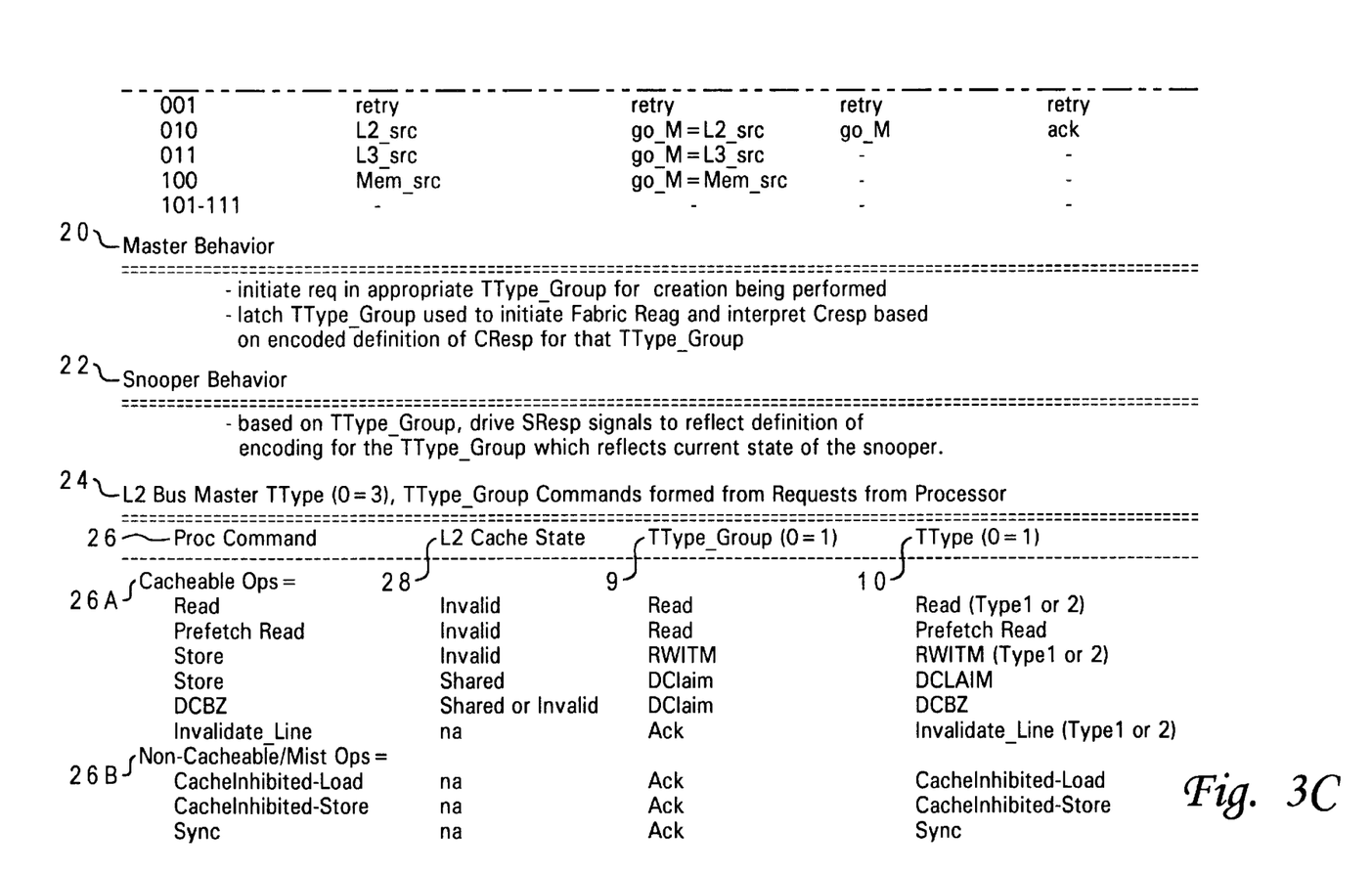

With reference now to the figures and in particular with reference to FIGS. 3A–3C, a conglomerate table 5 of different example definitions and formats of the bus master signal, the snoop response signals, and the combined response signal that utilize and implement the present invention features of groups of snoop responses and the transfer types within each group are shown. Referring to FIG. 2 and in the examples set forth in FIGS. 3A–3C and by using snoop response groups and transfer types, the present invention features allow the size of the snoop response bus or wire to be minimized or reduced to having only to be five (5) bits and represented by five (5) pins in each snoop logic that provides the snoop response therefrom. The present invention features also allow the size of the combined response ("CR") bus or wire to be minimized or reduced to having only to be three (3) bits and represented by three (3) pins in the combined logic that provides the combined response therefrom. The present invention is not in anyway limited to the specific numbers of busses or wires or pins for the snoop logic and the combined response logic disclosed in this specification, but the present invention provides the key advantage of minimizing and reducing the numbers of these busses, wires, or pins having to be used for snoop logic and combined response logic by grouping addresses, responses, and priorities. Thus, the present invention, in effect, provides a system and method that implements a multiprocessor system bus protocol that is able to handle a large number of snoop responses but yet be minimized and reduced in the amount of hardware and cost for implementing the snoop logic and the combined response logic.

In FIG. 3C, table 24 shows an example of the manner for forming and deriving the L2 bus master signal with the transfer type ("TType") and Ttype/snoop response group ("TType_Group") commands from the processor requests. Table 24 contains four columns: a first column for identifying the type of processor command 26, a second column for identifying L2 cache bus master state 28, a third column for providing the TType_Group (or snoop response group) 9 based on the processor command 26 and the L2 cache state 28, and a fourth column for providing the TType (or transfer type) 10 based on the processor command 26 and the L2 cache state 28. Two types of processor commands 26 exist: a cacheable operation 26A and a non-cacheable operation 26B. Cacheable operations 26A include but are not limited to read, pre-fetch read, store, a data-claim-a-block-to-zero ("DCBZ"), and invalidate line. Non-cacheable operations 26B include but are not limited to CacheInhibited Load, CacheInhibited Store, and Synchronization ("Sync"). The L2 cache state may be invalid, shared, or modified. "Na" means not applicable which indicates L2 does not manage any state for that type of operation.

For the cacheable operations 26A in table 24, if the processor command 26 is a read command and the L2 cache state 28 is invalid, then the TType_Group 9 is assigned as a read group and the TType 10 is assigned as a read operation, type 1 or 2. If the processor command 26 is a pre-fetch read command and the L2 cache state 28 is invalid, then the TType_Group 9 is assigned as a read group and the TType 10 is assigned as a pre-fetch load. If the processor command 26 is a store command and the L2 cache state 28 is invalid, then the TType_Group 9 is assigned as a read with intent to modify ("RWITM") group and the TType 10 is assigned as a RWITM operation, type 1 or 2. If the processor command 26 is a store command and the L2 cache state 28 is shared, then the TType_Group 9 is assigned as a data-claim ("DClaim") group and the TType 10 is assigned as a DClaim operation. If the processor command 26 is a DCBZ command and the L2 cache state 28 is shared or invalid, then the TType_Group 9 is assigned as a DClaim and the TType 10 is assigned as a DCBZ operation. If the processor command 26 is an invalidate line ("Invalidate_Line") command, then the TType_Group 9 is assigned as an acknowledge ("Ack") group and the TType 10 is assigned as an Invalidate_Line operation, type 1 or 2.

For the non-cacheable operations 26B in table 24, if the processor command 26 is a CacheInhibited load command, then the TType_Group 9 is assigned as an ack group and the TType 10 is assigned as a cache inhibited load operation. If the processor command 26 is a CacheInhibited store command, then the TType_Group 9 is assigned as an Ack group and the TType 10 is assigned as a cache inhibited store operation. If the processor command 26 is a synchronization ("sync") command, then the TType_Group 9 is assigned as an Ack group and the TType 10 is assigned as a sync operation.

In FIG. 3A, table 6 shows an example format and definition of the bus master signal 8, that is the system address bus signal at system bus line 112 of FIG. 1. The bus master signal 8 is shown to contain the following information: 1) AVAL, which is the address validation information that is used to identify whether a request is valid; 2) Address (0 to 31 bits), which is the address field identifying the address of the cache line being accessed; 3) TType_Group 9 (0 to 1 bits), which is the Transfer Type Group that identifies the snoop response group for a snoop response wherein the TType_Group 9 is derived from the processor request as shown in table 24 which was discussed earlier; some of the types of snoop response groups are the Read group, Read-With-Intent-to-Modify (RWITM) group, data-claim (DCLAIM) group, and Acknowledge or Miscellaneous (Ack) group; 4) TType 10 (0 to 3 bits), which is the transfer type within a group wherein the TType 10 is derived from the processor request as shown in table 24 which was discussed earlier; 5) Misc, which is the transfer size and other such miscellaneous information. As stated earlier, the bus master signal 8 is derived based on the processor request, and the bus master signal 8 obtains its values, particularly the TType_Group 9 and the TType 10, based on the assignments shown in table 24. These values, such as the assigned TType_Group 9 and the TType 10, are then passed to the snoopers.

Furthermore, in FIG. 3A, a table 7 shows an example format and definition of the snoop response signal and the combined response signal. The SResp 11 (0 to 4 bits) represents the snoop response indication that is sent from a snooper to the combined response logic or CResp logic. The CResp 12 represents the combined response indication that is sent from the combined response logic or CResp logic to the bus master and snoopers. For each of the four TType_Group (or snoop response group) encodings (i.e. for the Read, RWITM, DClaim, and Ack groups), unique definitions for TType 10, SResp 11, and CResp 12 exist for that group. Again, the advantage of the grouping is that the number of pins required for SResp 11 and CResp 12 is reduced.

FIG. 3A further shows a table 15 of four different example TType_Groups 9 with defined TTypes 10 in each of the groups 9. FIG. 3A shows that the defined TType_Groups 9 are the Read group 9A, the RWITM group 9B, the DClaim group 9C, and the Ack group 9D. The Read group 9A involves snoop responses that provide coherent reads that require data to be delivered and that does not require modification of data. The read group 9A has within it various transfer types ("TTypes") 10A. The TTypes 10A defined for TType_Group 9A are defined by four (4) bits. These TTypes 10A are: a cache line read (type 1 or low priority read) defined by the bits "0000"; another cache line read (type 2 or high priority read) defined by the bits "0001"; a DMA read (which is an Input/Output (I/O) read out to an I/O device) defined by the bits "0010"; a pre-fetch read (i.e. processor read) defined by the bits "0011". Other bits "0100" to "1111" are reserved for expansion.

Also, in FIG. 3A, the RWITM group 9B involves snoop responses that provide coherent stores that require data to be delivered. The RWITM group 9B has within it various transfer types ("TTypes") 10B. The TTypes 10B defined for TType_Group 9B are defined by four (4) bits. These TTypes 10B are: a RWITM (type 1 or low priority operation) defined by the bits "0000" and another RWITM (type 2 or high priority operation) defined by the bits "0001". Other bits "0010" to "1111" are reserved for expansion. Furthermore, in FIG. 3B, the DClaim group 9C involves snoop responses that provide coherent stores that do not require data to be delivered. A DClaim is similar to a RWITM since they are both store operations. DClaim does not require a copy of the data while a RWITM does. The DClaim group 9C has within it various transfer types ("TTypes") 10C. The TTypes 10C defined for TType_Group 9C are defined by four (4) bits. These TTypes are: a DClaim (type 1 or low priority operation) defined by the bits "0000"; another DClaim (type 2 or high priority data-claim) defined by the bits "0001"; and a DCBZ (a data-claim to take a block to zero(0)) defined by the bits "0010". Other bits "0010" to "1111" are reserved for expansion.

Still further, in FIG. 3B, the ack group 9D involves snoop responses that respond to commands that just need an acknowledge response. In other words, the snoop responses to a processor request that is in the ack group 9D only need to have proper snooper acknowledgment. For example, if data is being updated, all of the other snoopers may have to acknowledge that they have thrown the data away by providing an invalidate_line acknowledgement response. The ack group 9D has within it various transfer types ("TTypes") 10D. The TTypes 10D defined for TType_Group 9D are defined by four (4) bits. These TTypes are: an Invalidate_Line (type 1 or low priority operation) defined by the bits "0000"; another Invalidate_Line (type 2 or high priority operation) defined by the bits "0001"; a CacheInhibited Load defined by the bits "0011"; a CacheInhibited Store defined by the bits "0100"; a DMA Partial Read defined by the bits "0101"; a DMA Partial Write defined by the bits "0110"; a sync (synchronization operation) defined by the bits "0111". The Invalidate_Line, CacheInhibited Load, CacheInhibited Store and Sync operations are processor initiated operations while the DMA Partial Read and the DMA Partial Write operations are I/O initiated operations. The CacheInhibited Load and Store operations are loads and stores to and from input/output (I/O) spaces. The DMA Partial Read and Write operations relate to I/Os doing reads and writes of the system memory. Other bits "1000" to "1111" are reserved for expansion.

FIG. 3B also shows a table 18 showing example definitions of respective snoop responses (SResp) and combined responses (CResp) in the four different groups (i.e. TType_Groups 9). Table 18 shows a first column with the various defined five bit values for SResp 11. Each of the other four columns in table 18 represent one of the four different groups, which are the Read_Group 9A, the RWITM_Group 9B, the DClaim_Group 9C, and the Ack_Group 9D. If the TType Group 9 is the Read_Group 9A, then the SResp 11 have various five bit values for defining various Read snoop responses, such as: the null response defined by bits "00000"; the retry response defined by bits "00001"; the "L2 cache can source" response defined by bits "00010"; the "L3 cache can source" response defined by bits "00100"; and the "mem_ack" (memory acknowledgement) response defined by the bits "10000". If the TType Group 9 is the RWITM_Group 9B, then the SResp 11 have various five bit values for defining various RWITM snoop responses, such as: the null response defined by bits "00000"; the retry response defined by bits "00001"; the "L2 cache can source" response defined by bits "00010"; the "L3 cache can source" response defined by bits "00100"; a "go_Modified" response defined by bits "01000"; a "mem_Ack" response defined by bits "10000". If the TType Group 9 is the DCLAIM Group 9C, then the SResp 11 have various five bit values for defining various DCLAIM snoop responses, such as: the null response defined by bits "00000"; the retry response defined by bits "00001"; the "go_Modified" response defined by bits "01000"; a "mem_Ack" response defined by bits "10000". If the TType Group 9 is the ack Group 9D, then the SResp 11 have various five bit values for defining various ack snoop responses, such as: the null response defined by bits "00000"; the retry response defined by bits "00001"; a "Ack" response defined by bits "00010"; a "mem_Ack" response defined by bits "10000".

Furthermore, table 18 shows a first column with the various defined three bit values for the combined response or CResp 12. Each of the other four columns in table 18 represent one of the four different groups, which are the Read_Group 9A, the RWITM_Group 9B, the DClaim_Group 9C, and the Ack_Group 9D. If the TType Group 9 is the Read_Group 9A, then the CResp 12 have various three bit values for defining various Read combined responses, such as: the address error (add_err) response defined by bits "000"; the retry response defined by bits "001"; the "L2 cache sources" response defined by bits "010"; the "L3 cache sources" response defined by bits "011"; and the "mem_src" (memory source) response defined by the bits "100". If the TType Group 9 is the RWITM_Group 9B, then the CResp 12 have various three bit values for defining various RWITM combined responses, such as: the address error (add_err) response defined by bits "000"; the retry response defined by bits "001"; the go-modify-L2-sources ("go_M:L2_src") response defined by bits "010"; the go-modify-L3-sources ("go_M:L3_src") response defined by bits "011"; a go-modify-memory source "go_M:Mem_src" response defined by bits "100". If the TType Group 9 is the DCLAIM Group 9C, then the CResp 12 have various three bit values for defining various DCLAIM combined responses, such as: the address error (add_err) response defined by bits "000"; the retry response defined by bits "001"; the go Modified (go_M) response defined by bits "010". If the TType Group 9 is the ack Group 9D, then the CResp 12 have various three bit values for defining various ack combined responses, such as: the address error (add_err) response defined by bits "000"; the retry response defined by bits "001"; an ack response defined by bits "010".

Table 20 in FIG. 3C discusses the Master Behavior (Master Bus Behavior). The behavior of the master bus must initiate the processor request in the appropriate TType_Group 9 for the creation of the proper response to be performed. The behavior of the master bus must also latch this TType_Group 9 that is used to initiate the response so that the snoop response SResp 11 and the combined response CResp 12 are able to be properly interpreted, that is, the response is properly interpreted based on the encoded definition of the SResp 11 and the CResp 12 for that particular TType_Group 9. Table 22 in FIG. 3 discusses the Snooper Behavior (Snooper Behavior). The behavior of the snooper is based on the designated or latched TType_Group 9. The snooper behavior drives the SResp signals 11 out of the snooper based on the definition, rules, and priorities set forth in the TType_Group 9. In other words, the snooper behavior drives the SResp signals 11 to reflect the definition of encoding for the TType_Group 9, which reflects the current state of the snooper.

Therefore, in FIG. 3C, the TType Group 9 and TType 10 are derived from the processor request and passed through the bus master signal. The snoop responses are grouped into four (4) groups in the example. For each group, the snoop response is interpreted differently and driven by the five pins of the snooper. In the presence of a retry, the combined response logic 410 halts the processing of the request so that it can be retried at a later time. When a snooper provides a null response, it is indicating that based on its state, it has no reason to prevent the operation from succeeding. Generally, the null response means that the data of the snooper is invalid. If multiple L2 and L3 cache snoopers are available (i.e. L2 and L3 SResp bits respectively are 00010 and 00100) to perform the request, then the combined response logic 410 chooses one of the snoopers, preferably the snooper that can supply data the fastest, based on a priority or rule scheme. If none of the snoopers are available, then the memory controller (Mem_Ack) will source it. The MEM_ACK is activated by the memory controller for all addresses which fall in the range of system memory. If the snooper (i.e. L2 or L3 cache) is available, then it has a shared copy of the data and it can be sourced.

Figure 4:
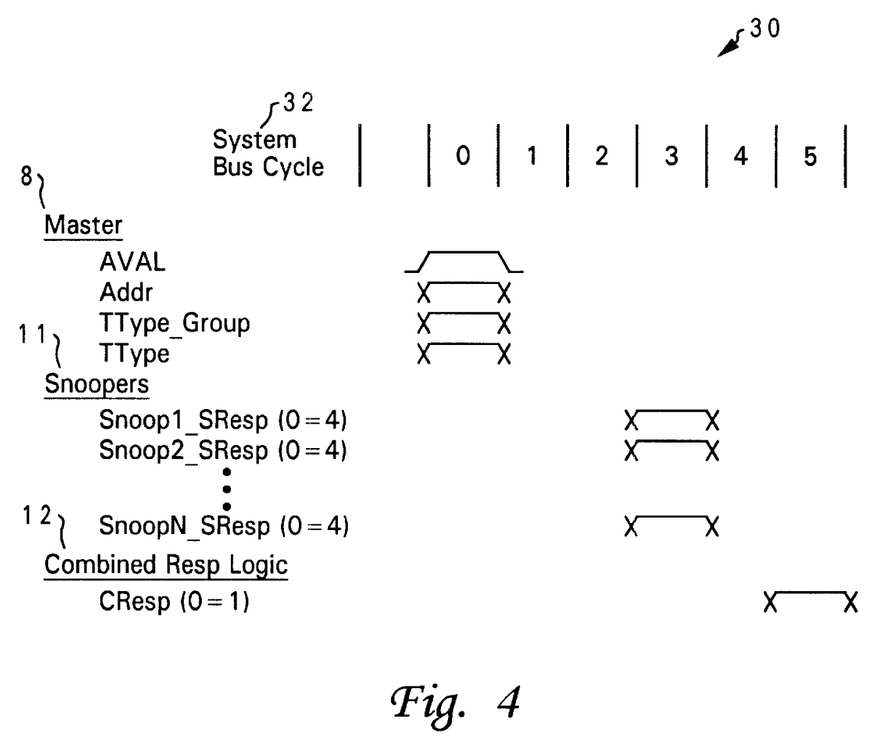
FIG. 4 is an example timing diagram of the system bus protocol signal/response flow from the master bus signal to the snooper response signals to the combined response signal for the present invention multiprocessor system bus protocol with group addresses, responses, and priorities.

With reference now to the figures and in particular with reference to FIG. 4, an example timing diagram 30 of the system bus protocol signal/response flow from the master bus signal 8 to the snooper response signals 11 to the combined response signal 12 is shown. The timing diagram 30 shows that the master bus signal 8 is sent from the master to the snoopers at cycle 0. At cycle 3, the snoopers then provide their snoop responses (SResps) 11, and the snoop responses 11 are sent to the combined response logic 410. The combined response logic 410 receives the snoop responses 11, and the combined response logic 410 provides the CResp 12 at cycle 5. The advantage of the timing of the present invention is that another master bus signal is able to be started at another cycle, such as cycle 1, and obtain the responses in corresponding latter cycles, such as the snoop responses 11 at cycle 4 and the combined response 12 at cycle 6. Thus, various processor requests are able to be continuously processed within various timing cycles.

Figure 5:
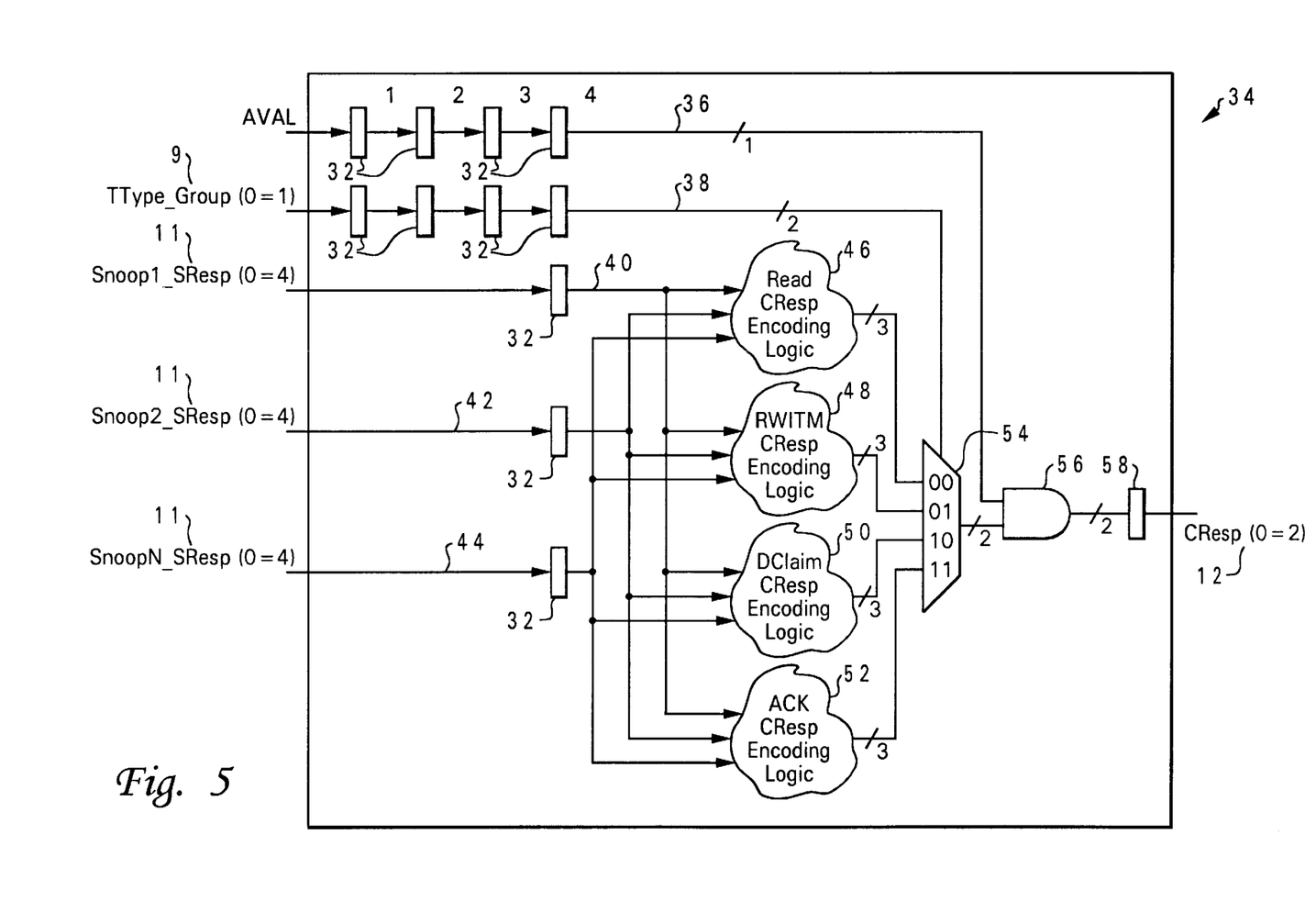
FIG. 5 is a block diagram of an example combined response logic system for the present invention multiprocessor system bus protocol with group addresses, responses, and priorities.

With reference now to the figures and in particular with reference to FIG. 5, the implementation of the combined response logic 410 for the present invention is shown. FIG. 5 shows a block diagram 34 of the combined response logic 410. The block diagram 34 comprises a signal line 36 for the AVAL (address request valid) signal, a line 38 for the TType_Group 9 information, lines 40, 42, 44 and other such lines for respective SResp signals 11 wherein the SResp signals 11 are each fed into a Read CResp Encoding logic block 46, a RWITM CResp Encoding logic block 48, a DCLAIM CResp Encoding logic block 50, and an Ack CResp Encoding logic block 52.

Pipeline latches 32 of the AVAL signal from the master bus signal are fed into line 36. Pipeline latches 32 of the TType_Group 9 are fed into line 38. The Ttype_Group 9 used for the particular transaction must be pipeline latched with the AVAL signal of the master bus signal in a manner such that it gets presented to the CResp encoding logic 46, 48, 50 and 52 with the associated responses from the snoopers for that transaction. The TType_Group 9 is fed into a group selector block 54, and the logic of the group selector block 54 selects the output from one of the appropriate CResp encoding logic blocks 46, 48, 50, or 52 based on the specified Ttype_Group 9 provided.

For example, if the TType_Group 9 has been assigned to be a Read group based on the processor request, then the Read group signal sent to the group selector block 54 causes a value "00" to be set thereat, and the output from the Read CResp encoding logic block 46 is selected and all other outputs from blocks 48, 50, and 52 are ignored. If the TType_Group 9 has been assigned to be a RWITM group based on the processor request, then the RWITM group signal sent to the group selector block 54 causes a value "01" to be set thereat, and the output from the RWITM CResp encoding logic block 48 is selected and all other outputs from blocks 46, 50, and 52 are ignored. If the TType_Group 9 has been assigned to be a DCLAIM group based on the processor request, then the DCLAIM group signal sent to the group selector block 54 causes a value "10" to be set thereat, and the output from the DCLAIM CResp encoding logic block 50 is selected and all other outputs from blocks 46, 48, and 52 are ignored. If the TType_Group 9 has been assigned to be an Ack group based on the processor request, then the Ack group signal sent to the group selector block 54 causes a value "11" to be set thereat, and the output from the Ack CResp encoding logic block 52 is selected and all other outputs from blocks 46, 48, and 50 are ignored.

The appropriately selected CResp signal 12 is outputted from the group selector block 54. The AVAL signal and the CResp signal 12 are fed into an AND gate 56. If the AND gate 56 senses that the AVAL signal is invalid or zero (0), then the generated CResp signal 12 will not be provided by the combined response logic 410 and the TType_Group 9 will be latched off from the AVAL signal. On the other hand, if the AND gate 56 senses that the AVAL signal is valid or one (1), then the generated CResp signal 12 will be provided from the combined response logic 410. The CResp encoding logic is different for each of the four different groups. Each of the CResp encoding logic blocks 46, 48, 50, and 52 has a unique priority and rule scheme in determining and generating a combined response based on the received snooper responses. Thus, the combined response logic 410 utilizes a priority and rule scheme in handling or processing the snoop responses in order to generate an appropriate combined response. Therefore, the present invention is not in any way limited to a specific priority/rule scheme or schemes disclosed for the combined response logic 410, and any suitable priority/rule scheme that is able to determine an appropriate combined response from a number of snooper responses may be used with the present invention. The specific details of the priority/rule scheme or schemes are not per se important for being able to implement the present invention.

While the invention has been particularly shown and described with reference to a preferred embodiment, it will be understood by those skilled in the art that various changes in form and detail may be made therein without departing from the spirit and scope of the invention.

What is claimed is:

1. A method of operating a data processing system including a plurality of snoopers coupled to an interconnect, said method comprising:
    combined response logic receiving an indication of a transfer type of a memory access request and receiving snoop responses of the plurality of snoopers to the memory access request;
    in response to said snoop responses, the combined response logic generating a plurality of different possible combined responses for the memory access request;
    the combined response logic selecting a combined response among the plurality of different possible combined responses based upon the indication of transfer type; and
    the combined response logic outputting the selected combined response for distribution to said plurality of snoopers.

2. The method of claim 1, and further comprising:
    receiving from a master of the memory access request a validity indication associated with the memory access request; and
    qualifying said selected combined response prior to said outputting utilizing said validity indication.

3. The method according to claim 1, wherein receiving an indication of a transfer type comprises receiving a transfer type group indication.

4. The method according to claim 3, wherein receiving the transfer type group indication comprises receiving a transfer type group indication indicating one of a read group, a read-with-intent-to-modify group, a data claim group, and an acknowledge group.

5. The method according to claim 4, wherein the transfer type group of the memory access request is the read group and wherein receiving snoop responses of the plurality of snoopers comprises receiving from the plurality of snoopers snoop responses among a null response, a retry response, a cache-can-source response, and a memory acknowledgment response.

6. The method according to claim 4, wherein the transfer type group of the memory access request is the read-with-intent-to-modify group and wherein receiving snoop responses of the plurality of snoopers comprises receiving from the plurality of snoopers snoop responses among a null response, a retry response, a cache-can-source response, a go-modified response, and a memory acknowledgment response.

7. The method according to claim 4, wherein the transfer type group of the memory access request is the data-claim group and wherein receiving snoop responses of the plurality of snoopers comprises receiving from the plurality of snoopers snoop responses among a null response, a retry response, a go-modified response, and a memory acknowledgment response.

8. The method according to claim 4, wherein the transfer type group of the memory access request is the acknowledgment group and wherein receiving snoop responses of the plurality of snoopers comprises receiving from the plurality of snoopers snoop responses among a null response, a retry response, and a memory acknowledgment response.

9. The method according to claim 1, further comprising:
    assigning the one of the snoop response groups as a read group and one of the transfer types as a read type if the processor request is a read command and the state of the memory device is invalid, assigning the one of the snoop response groups as a read group and one of the transfer types as a pre-fetch read if the processor request is a pre-fetch read command and the state of the memory device is invalid, assigning the one of the snoop response groups as a read-with-intent-to-modify group and one of the transfer types as a read-with-intent-to-modify type if the processor request is a store command and the state of the memory device is invalid, assigning the one of the snoop response groups as a data-claim group and one of the transfer types as a data-claim if the processor request is a store command and the state of the memory device is shared, assigning the one of the snoop response groups as a data-claim group and one of the transfer types as a data-claim to take a block to zero if the processor request is a data-claim to take a block to zero and the state of the memory device is shared, assigning the one of the snoop response groups as a data-claim group and one of the transfer types as a data-claim to take a block to zero if the processor request is a data-claim to take a block to zero and the state of the memory device is invalid, assigning the one of the snoop response groups as an acknowledgement group and one of the transfer types as an invalidate line type if the processor request is an invalidate line command, assigning the one of the snoop response groups as an acknowledgement group and one of the transfer types as a cache inhibited load if the processor request is a cache inhibited load command, assigning the one of the snoop response groups as an acknowledgement group and one of the transfer types as a cache inhibited store if the processor request is a cache inhibited store command, and assigning the one of the snoop response groups as an acknowledgement group and one of the transfer types as a synchronization if the processor request is a synchronization command.

10. The method of claim 1, wherein a plurality of transfer type indication values are possible, and wherein generating a plurality of different possible combined responses for the memory access request comprises concurrently generating a plurality of different possible combined responses that are each uniquely associated with a particular one of the plurality of possible transfer type indication values.

11. The method of claim 1, wherein multiple diverse combined responses utilize a same bit encoding, said method further comprising said plurality of snoopers interpreting said selected combined response by reference to said transfer type indication.

12. A data processing system comprising:
an interconnect;
a plurality of devices coupled to the interconnect, said plurality of devices including at least a master and a plurality of snoopers; and
combined response logic, coupled to the plurality of snoopers, that responsive to receiving an indication of a transfer type of a memory access request and receiving snoop responses of the plurality of snoopers to the memory access request, generates a plurality of different possible combined responses for the memory access request, selects a combined response among the plurality of different possible combined responses based upon the indication of transfer type, and outputs the selected combined response to said plurality of snoopers.

13. The data processing system according to claim 12, wherein at least some of the snoopers comprise cache memory devices.

14. The data processing system according to Claim 12, and further comprising a plurality of processors each associated with different ones of said plurality of snoopers.

15. The data processing system of claim 12, said combined response logic including a response qualifying circuit that qualifies said selected combined response utilizing a validity indication received from said master.

16. The data processing system of claim 12, wherein the indication of a transfer type comprises a transfer type group indication.

17. The data processing system of claim 16, wherein the transfer type group indication indicates one of a read group, a read-with-intent-to-modify group, a data claim group, and an acknowledge group.

18. The data processing system of claim 12, wherein a plurality of transfer type indication values are possible, said and wherein said combined response logic includes a plurality of response encoding circuits that are each uniquely associated with a particular one of the plurality of possible transfer type indication values and each produce a respective one of said plurality of possible combined responses.

19. The data processing system of claim 18, and further comprising a selection circuit coupled to said plurality of response encoding circuits, wherein said selection circuit, responsive to said transfer type indication, selects a particular one of said plurality of possible combined responses for output.

20. The data processing system of claim 12, wherein multiple diverse combined responses utilize a same bit encoding, and wherein said plurality of snoopers interpret said selected combined response by reference to said transfer type indication.

21. A memory device for a data processing system, said memory device comprising:
data storage;
a directory of contents of said data storage; and
snoop logic, coupled to an interconnect, that snoops memory access requests that each include a request address and a transfer type indication, said snoop logic including:
means for determining snoop responses to said memory access requests by reference to said directory utilizing said request addresses;
means for outputting encoded snoop responses to combined response logic; and
means for interpreting combined responses for said memory access requests, wherein diverse combined responses utilize a same bit encoding, and wherein said means for interpreting combined responses interprets said combined responses by reference to said transfer type indications.

22. A data processing system, comprising:
a plurality of processors;
a plurality of memory devices in accordance with claim 21;
an interconnect coupling said plurality of memory devices; and
combined response logic coupled to said plurality of memory devices, wherein for each memory access request, said combined response logic receives snoop responses generated by said plurality of memory devices and a transfer type indication, compiles said snoop responses to produce a combined response, and outputs said combined response to said plurality of memory devices.

23. A combined response circuit, comprising:

a plurality of response encoding circuits that each receive a plurality of snoop responses for a memory access request as inputs and that produce a plurality of possible combined responses;

a selection circuit coupled to said plurality of response encoding circuits, wherein said selection circuit, responsive to a transfer type indication for the memory access request, selects a particular one of said plurality of possible combined responses for output; and a response qualifying circuit coupled to said selection circuit, wherein said response qualifying circuit qualifies said selected combined response utilizing a validity indication associated with said memory access request.

24. A combined response circuit, comprising:

a plurality of response encoding circuits that each receive a plurality of snoop responses for a memory access request as inputs and that produce a plurality of possible combined responses, wherein said plurality of response encoding circuits generate said plurality of possible combined responses concurrently; and a selection circuit coupled to said plurality of response encoding circuits, wherein said selection circuit, responsive to a transfer type indication for the memory access request, selects a particular one of said plurality of possible combined responses for output.

* * * * *